Figure 3:
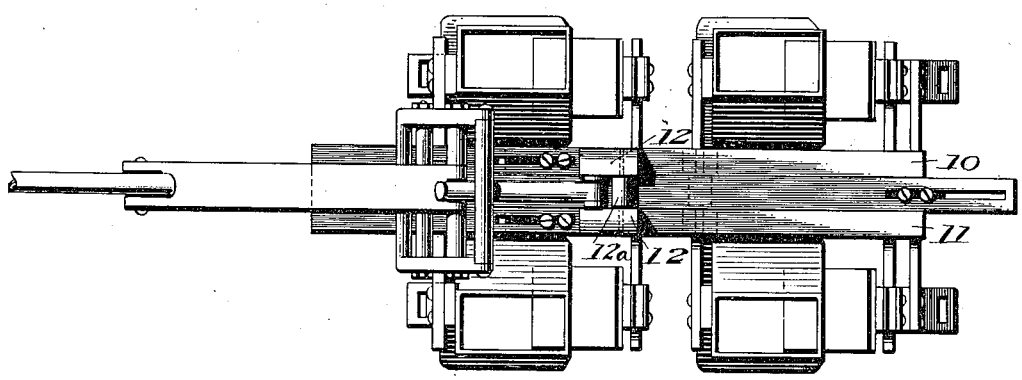

A. A. ROSENFIELD.
MECHANICAL COW MILKER.
APPLICATION FILED SEPT. 29, 1919. RENEWED MAR. 4, 1922.
1,412,092.
Patented Apr. 11, 1922.
4 SHEETS—SHEET 1.
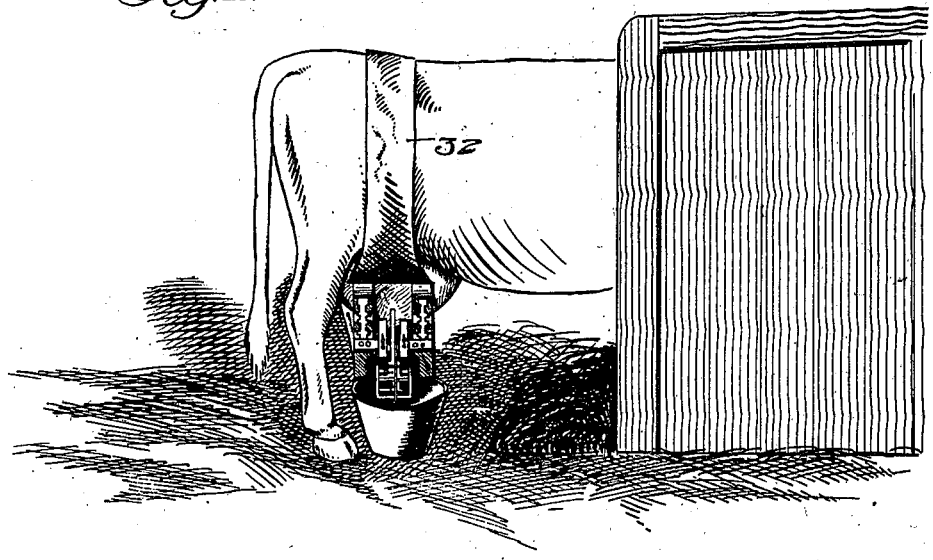
Fig. 1.
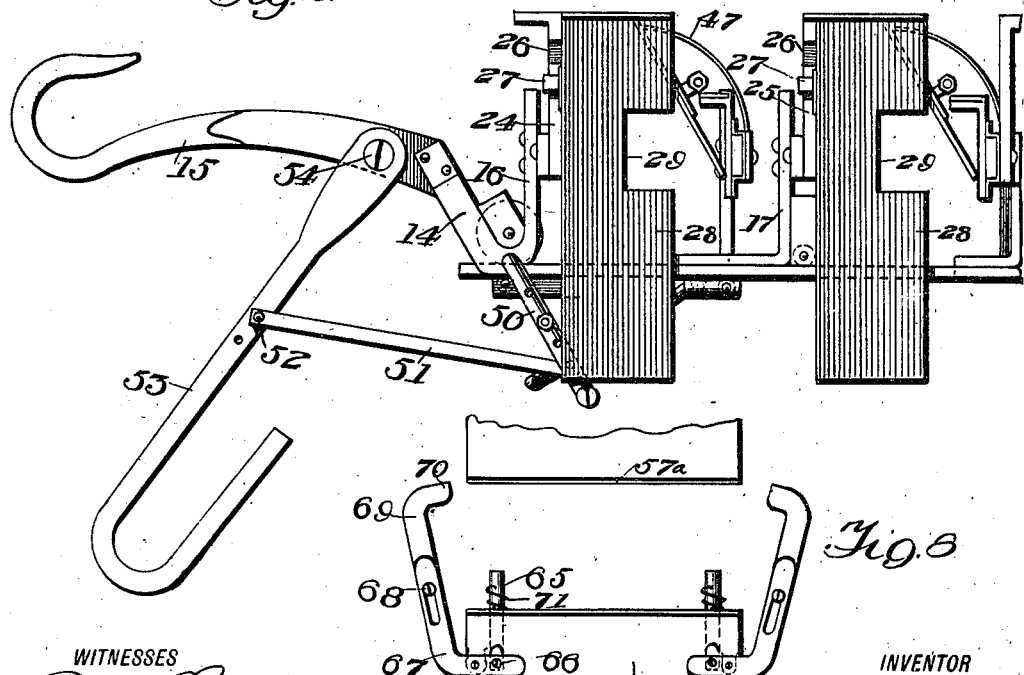
Fig. 2.
Fig. 3.
WITNESSES
INVENTOR
Adolph A. Rosenfield,
BY
ATTORNEYS

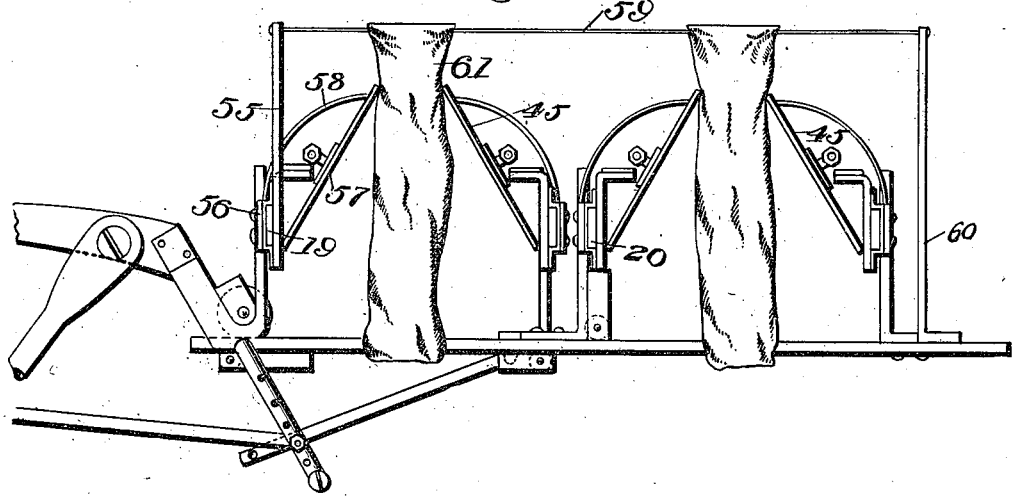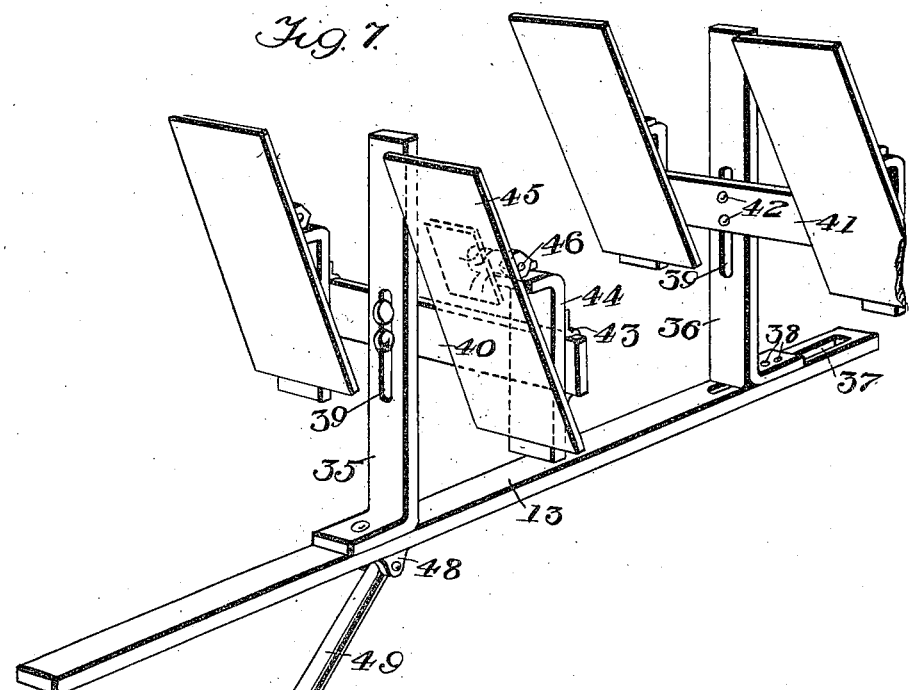

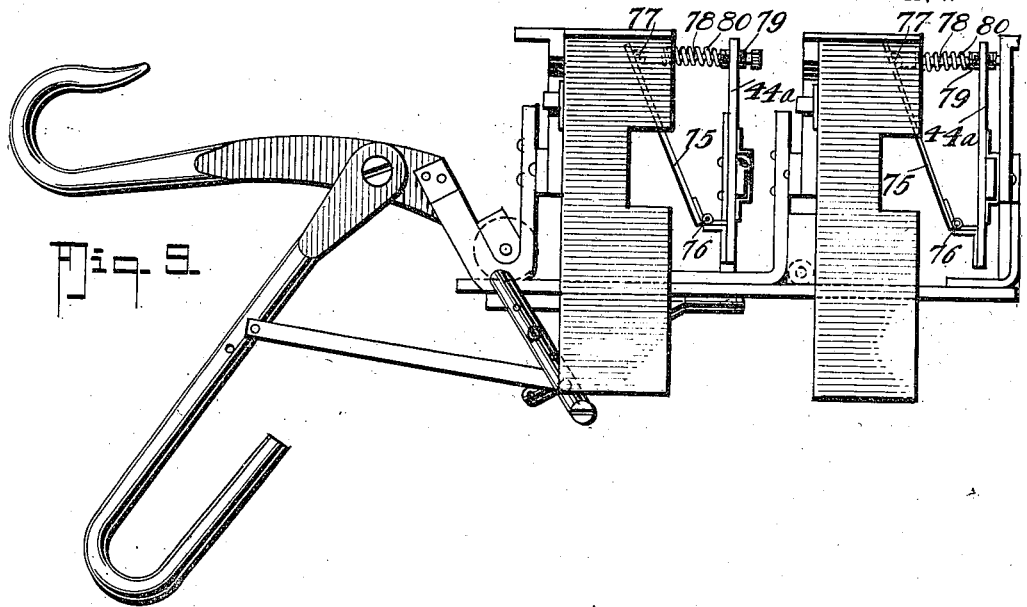
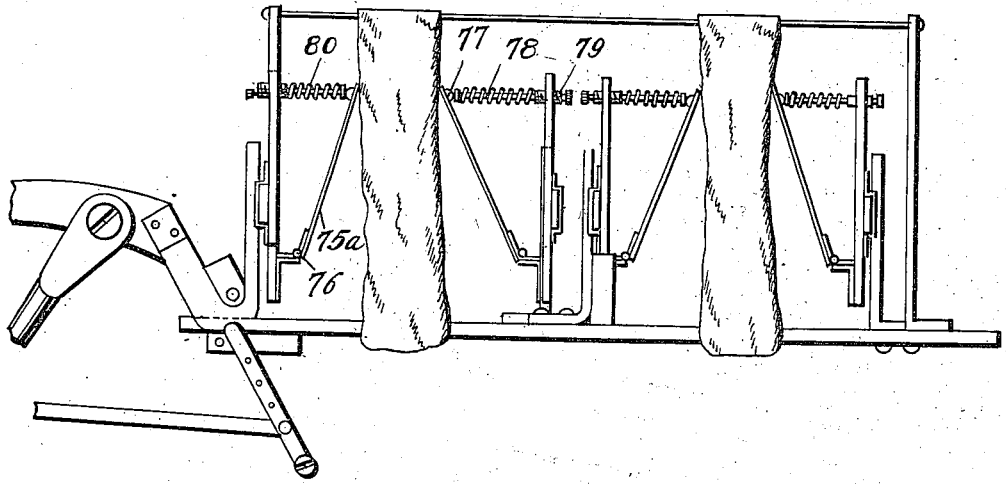
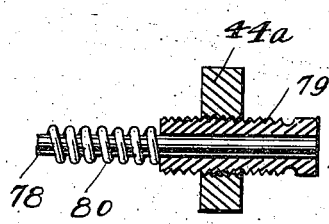

UNITED STATES PATENT OFFICE.

ADOLPH ABB ROSENFIELD, OF DAYTON, NEW JERSEY.

MECHANICAL COW MILKER.

1,412,092.  Specification of Letters Patent.  Patented Apr. 11, 1922.

Application filed September 29, 1919, Serial No. 327,131. Renewed March 4, 1922. Serial No. 541,193.

*To all whom it may concern:*

Be it known that I, ADOLPH ABB ROSENFIELD, formerly a subject of the Russian Government, and having declared my intention of becoming a citizen of the United States, and a resident of Dayton, in the county of Middlesex and State of New Jersey, have invented certain new and useful Improvements in Mechanical Cow Milkers, of which the following is a specification.

My present invention relates generally to cow milkers, and more particularly to manually operated devices of this character, my object being the provision of a simple, readily adjustable, and conveniently attachable and detachable device which is entirely mechanical and will avoid the time and labor of hand milking, as well as the expense of vacuum and other complicated installations.

Figure 4:
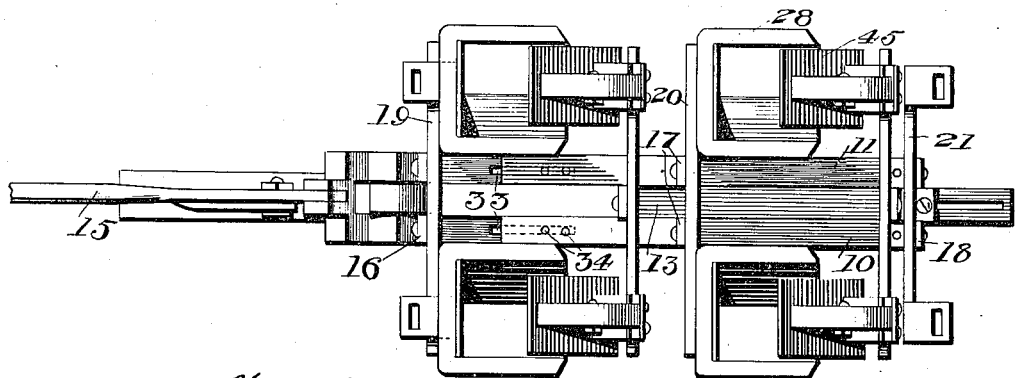
Figure 5:
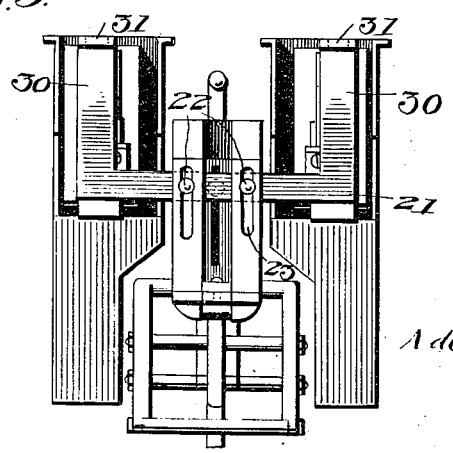

Other objects of my invention, as well as the resulting advantages of the particular construction I propose, will be apparent from the following description, reference being made to the accompanying drawings, forming a part of this specification, and in which, Fig. 1 is a side view illustrating the practical application of my invention, Fig. 2 is an enlarged side view of my improved milker, Fig. 3 is a bottom plan view thereof, Fig. 4 is a top plan view, Fig. 5 is a rear elevation, Fig. 6 is a side view illustrating a modified form, Fig. 7 is a detail perspective view of the movable carriage or slide, removed, Fig. 8 is a detail top plan view of a pair of presser plates as seen in Fig. 6, illustrating another slight modification, Fig. 9 is a side view illustrating another modified form embodying readily adjustable spring presser plates in connection with cups like those of Figs. 1 to 5 inclusive, Fig. 10 is a detail horizontal section taken through one of the upright holders of Fig. 9 in a plane through the center of one of the adjusting screws, Fig. 11 is a side view showing the readily adjustable spring plates used in opposed relation without the cups.

Referring now to these figures, and particularly to Figures 1 to 5 inclusive, my invention proposes a mechanical cow milker which as best seen in Figures 1, 3 and 4, consists of a main frame including spaced parallel bars 10 and 11, which are rigidly connected in their spaced apart relation by stub shafts joining bearing blocks 12 secured to the lower surface of the bars 10 and 11, the said shafts supporting rollers 12ª below the plane of the bars 10 and 11 and extending across the space therebetween. The spaced apart relation of the bars 10 and 11 thus provides a lengthwise slot in the frame between the bars, for the reception of the lower longitudinal frame strips 13 of the carriage or slide to be hereinafter described, the main frame having an upturned forward end 14, as best seen in Fig. 2, to which a forwardly extending handle 15 is connected.

The main frame is also provided with forward, intermediate and rear uprights, 16, 17 and 18, as best seen in Fig. 4, these uprights projecting vertically from the two spaced bars 10 and 11 and having vertically slotted openings by means of which the intermediate portions of cross bars 19, 20 and 21 are adjustably secured through the use of clamping bolts 22, the slotted openings 23 of the rear upright being indicated in Fig. 5.

The forward and intermediate cross bars 19 and 20 are also slotted lengthwise adjacent their outer ends to adjustably receive and be connected to the lower ends of upright holders 24 and 25, the latter of which are preferably notched at 26, to receive the forwardly projecting lugs 27 of a pair of teat cups 28 at each side of the main frame, the lower portions of which teat cups 28 are entirely closed, and the upper portions of which open rearwardly and are cut away at their sides as at 29, for a purpose to be presently described.

The forward upright holder 24, and the rear upright 30 of the rear cross bar 21, are provided at their upper ends with apertured angular extremities 31, so that the device as a whole may be attached to an animal in use by means of a body-encircling band 32, as seen in Fig. 1, the lower ends of which have spaced hooks to enter the openings of the extensions 31, thus supporting the milker with the handle 15 of the main frame projecting to one side of the animal in connection with which it is supported.

The frame bars 10 and 11 are preferably slotted lengthwise, as at 33 in Figs. 3 and 4, providing for the adjustable connection of the intermediate upright 17, by means of clamping bolts 34, so that with the adjustment of the cross bars 19 and 20, and the upright holders 24 and 25, it is obvious that the teat cups 28 may be readily and quickly adjusted whenever this operation becomes necessary.

The carriage or slide before mentioned, and shown in detail in Fig. 7, is also provided with uprights 35 and 36, respectively located rearwardly of the forward and intermediate uprights 16 and 17 of the main frame, the rear upright 36 being adjustably secured to the slide bar 13 by virtue of the slotted rear end 37 of said slide bar and clamping bolts 38. Both of these uprights 35 and 36 have vertically slotted openings 39, by means of which cross bars 40 and 41 are adjustably connected through the use of clamping bolts 42, and the outer ends of each of these cross bars 40 and 41 are adjustably engaged by brackets 43 in connection with upright holders 44, which are thus adjustable laterally toward and away from one another and arranged in pairs at opposite sides of the slide bar 13 to coincide with the arrangement of the teat cups 28 on the main frame. To the upper end of the upright holders 44, the rear surface of an upright presser plate 45 is hinged as at 46, the rear surface of the presser plate being engaged adjacent its upper end by a spring 47, the lower end of which is anchored in connection with its adjustable clamping bracket 43.

The several presser plates 45 are held, normally in upwardly and forwardly inclined relation, and in position to enter the upper rearwardly opening portions of the several teat cups 28, the cross bars 40 and 41 extending into the recessed side portions of the cups 28 when the slide or carriage is shifted forwardly to project the inclined presser plate into the teat cup, this movement being simultaneous of course, in connection with the series of teat cups and presser plates.

For the purpose of shifting the carriage or slide, the lower portion of the slide bar 13 is provided at intermediate points with a bearing 48 in which is pivotally supported the rear end of a connecting rod 49, the latter having a series of apertures 49ª at its forward end, as best seen in Fig. 7, connected to the lower portion of a depending crank 50, whose upper portion is pivotally connected to the sides of the main frame at the lower end of its forward angular portion 14 before referred to. Connected at its rear end to the depending crank 50, is a second connecting rod 51, the forward end of which is pivotally and adjustably connected at 52 to a lever 53 intermediate the ends of the latter. One end of the lever 53 is pivotally connected at 54 to the handle 15 of the main frame, and thus when the lever 53 is pressed toward the handle 15 of the main frame, the two links 49 and 51 and the crank 50, and thus the slide bar 13 will be shifted forwardly so that the several presser plates 45 will be projected into the several teat cups 28, the incli- nation of the presser plates 45, by means of the springs 47 serving to properly apply initial pressure adjacent to the upper portion of the teat cups, so that in the further application of the pressure, the operation will resemble, so far as is possible with the mechanical part employed, the usual hand operation.

It is of course to be understood that in practice the mechanical device provided by my invention will be utilized over a bucket which will receive the milk from the lower open end of the lower closed portions of the several teat cups 28 and that in adjusting the device in connection with a cow, and securing it in position by means of the body-encircling band 32, previously described, the parts will be adjusted through the several connections previously described so as to conveniently receive the teats within the several teat cups 28.

It is possible, however, that the teat cups 28 may be dispensed with and an apparatus employed as in Fig. 6 where the teat cups are removed and upright holders 55 inserted in connection with the main frame uprights by adjustably connecting the same with brackets 56, upon the forward and intermediate cross bars 19 and 20, these upright holders supporting pivoted pressure plates 57 mounted in connection with said holders in a manner similar to the mounting of the presser plates 45 of the slide or carriage, as previously described, so that the main frame will have spring-controlled presser plates 57, the springs of which are indicated at 58 in Fig. 6, to oppose the presser plates 45 of the carriage or slide.

In the form of the invention shown in Fig. 6, wires or similar holding means, as indicated at 59, will be extended between the upper end of the forward and rear holders 55 and 60 respectively, to which are attached the upper ends of flexible teat holding sacks 61, open at the upper and lower ends thereof and disposed between the several opposing presser plates 45 and 57. The lower ends of sacks 61 will of course be open for the outflow of the milk, and the carriage or slide in this form of the invention is actuated through the same means employed in connection with the previously described form of construction shown in Figures 1 to 5 inclusive.

It is obvious, therefore, that my invention provides a readily adjustable device for doing by purely mechanical arrangement and in a speedy, effective manner, what is now either done by hand, at the expense of much time and labor, or by vacuum systems and the like, involving expensive installation.

It is also to be observed that my invention provides a device which while manually actuated, simultaneously acts upon all four teats and needs no manual support while in operation owing to the conveniently attachable supporting means, as shown and described.

I may also adopt some means to avoid all tendency of the upper portions of the two presser plates 45 and 57 from movement away from one another after pressure has been applied to bring them to substantially vertical parallel position, in view of the fact that such tendency may squeeze the milk upwardly instead of downwardly. I may for this purpose adopt an expedient such as shown in Fig. 8 wherein one of the two plates, for instance, the plate 45ª, may have openings adjacent to each side thereof, and its upper edge, for the reception of pins 65 whose inner ends oppose the presser plate 57ª and whose outer ends are pivotally connected at 66 to one end of a pair of bell crank levers 67, the opposite ends of which are adjustably connected at 68 to locking arms 69, having angular extensions 70 for movement rearwardly of the plates 57ª after the latter have engaged and shifted the pin 65 in outward direction. This movement will take place against the tension of springs 71 so that the instant pressure is relieved from the plates, the locking arms 69 will be retracted so that the plates 45ª and 57ª will be free to recede to their spaced relation as seen in Figure 6. This construction last described simply obviates the above stated difficulty in view of the fact that the springs 47 cannot be made very strong on account of the danger of cutting by the upper inner edges of the presser plates.

I may also adopt a readily adjustable spring device in connection with either single presser plates working in connection with cups as in Fig. 9, or double presser plates working in opposed relation, as in Fig. 11, especially in connection with hard milkers. The presser plates 75 of Fig. 9 are each hingedly mounted at 76 at their lower edges and have their upper edges pivotally connected at 77 to guide rods 78. These guide rods work outwardly through bearing members 79 carried by upstanding portions of the uprights 44ª and these bearing members 79 are threaded in the said upstanding portions of the uprights and their inner ends receive thereagainst one end of springs 80 coiled around the rods 78 between the presser plates 75 and the bearing members. In this way, by simply screwing inwardly or outwardly upon the bearing members 79 the tension exerted by the springs 80 to resist yielding of the presser plates on their hinges 76 in operation may be effectively controlled and by this adjustment and the particular relative disposition of the parts, the construction of Figs. 9 and 11 is more especially adapted for what are known as hard or difficult milkers.

The detail of the connection of one of the bearing members 79 appears clearly in Fig. 10 and Fig. 11 differs from Fig. 9 only, from the fact that in Fig. 9, the presser plates 75, last described, are utilized singly in connection with cups like those of Figs. 1 to 5 inclusive, while in Fig. 11, the presser plates 75ª, the construction of each of which duplicates that of the presser plates 75, are used in opposed pairs without cups, as in the form shown in Fig. 6.

I claim:—

1. A mechanical cow milker comprising a main frame having a handle, a plurality of presser plates movably mounted therein, a carriage slidable in the said main frame, a lever having connection with the main frame and with the said carriage for actuating the latter, a plurality of presser plates movably connected to the said carriage and opposing the presser plates of the main frame, means normally holding the opposed presser plates in angular position with their upper ends in contiguous relation, and automatically releasable means carried by the upper portion of one of the presser plates of each pair, to secure the same against movement away from one another while the plates are moving toward one another.

2. A mechanical cow milker comprising a main frame having a handle, a plurality of presser plates movably mounted therein, a carriage slidable in the said main frame, a lever having connection with the main frame and with the said carriage for actuating the latter, a plurality of presser plates movably connected to the said carriage and opposing the presser plates of the main frame, means normally holding the opposed presser plates in angular position with their upper ends in contiguous relation, and spring controlled hooks carried by the upper portion of one of the plates of each pair, to engage the upper portion of the other plate and prevent movement of the said upper portions of the plates away from one another during the movement of the lower portions of the plates toward one another.

3. A mechanical milking device including a frame, a carriage movable therein, a lever for moving the carriage, and cooperating teat engaging means carried by the frame and carriage including vertically slotted uprights on the carriage one of which is adjustable in the length of the carriage with respect to the other, cross arms having connecting means vertically adjustable in the slots of the uprights, upright holders slidable horizontally on the cross arms, teat engaging presser plates hingedly connected at their lower ends to the holders, and springs between the upper end of the holders and said presser plates, and adjusting members working in the holders for controlling the effective pressure of said springs.

ADOLPH ABB ROSENFIELD.